(12) United States Patent
Zhou et al.

(10) Patent No.: US 10,747,016 B2
(45) Date of Patent: Aug. 18, 2020

(54) 3D DISPLAY DEVICE

(71) Applicant: BOE Technology Group Co., Ltd., Beijing (CN)

(72) Inventors: Chunmiao Zhou, Beijing (CN); Dacheng Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/118,233

(22) Filed: Aug. 30, 2018

(65) Prior Publication Data
US 2019/0235321 A1 Aug. 1, 2019

(30) Foreign Application Priority Data

Jan. 30, 2018 (CN) .......................... 2018 1 0089676

(51) Int. Cl.
*G02B 30/25* (2020.01)
*G02F 1/13363* (2006.01)
(Continued)

(52) U.S. Cl.
CPC .......... *G02B 30/25* (2020.01); *G02B 5/3058* (2013.01); *G02F 1/133514* (2013.01);
(Continued)

(58) Field of Classification Search
CPC .................... G02B 27/26; G02B 30/25; G02F 2001/133548; G02F 1/1347; G02F 1/13471
See application file for complete search history.

(56) References Cited

U.S. PATENT DOCUMENTS

| | | | | |
|---|---|---|---|---|
| 6,084,647 A | * | 7/2000 | Hatano | .................. G02B 27/26 |
| | | | | 349/15 |
| 2006/0023143 A1 | * | 2/2006 | Lee | ......................... G02B 27/26 |
| | | | | 349/102 |

(Continued)

FOREIGN PATENT DOCUMENTS

| CN | 101782687 A | 7/2010 |
|---|---|---|
| CN | 102109631 A | 6/2011 |

(Continued)

OTHER PUBLICATIONS

Office Action issued in corresponding Chinese Patent Application No. 201810089676.0, dated Oct. 28, 2019.

*Primary Examiner* — Jessica M Merlin
(74) *Attorney, Agent, or Firm* — McDermott Will & Emery LLP

(57) ABSTRACT

A 3D display device comprises first and second substrates disposed opposite one another; a liquid crystal layer; a color filter layer between the first substrate and the liquid crystal layer, a plurality of pixel regions arranged in an array being formed on the color filter layer, and each of the plurality of pixel regions comprising first and second sub-pixels; and a first polarizer on a side of the first substrate, the first polarizer comprising a plurality of wire grid polarizers arranged in an array, two adjacent ones of the plurality of wire grid polarizers comprising a plurality of columns of first sub-wire grid polarizers and second sub-wire grid polarizers which are alternately arranged with each other. An orthographic projection of each column of the first and second sub-wire grid polarizers on the pixel regions is overlapped with at least one column of first sub-pixels and second sub-pixels, respectively.

10 Claims, 4 Drawing Sheets

(51) Int. Cl.
*G02F 1/1335* (2006.01)
*G02F 1/1337* (2006.01)
*G02B 5/30* (2006.01)
*G02B 5/20* (2006.01)

(52) U.S. Cl.
CPC .. *G02F 1/133528* (2013.01); *G02F 1/133636* (2013.01); *G02F 1/133707* (2013.01); *G02B 5/201* (2013.01); *G02F 2001/133531* (2013.01); *G02F 2001/133548* (2013.01); *G02F 2001/133638* (2013.01)

(56) References Cited

U.S. PATENT DOCUMENTS

| | | | |
|---|---|---|---|
| 2012/0057106 A1* | 3/2012 | Park | G02F 1/133528 349/96 |
| 2012/0169979 A1 | 7/2012 | Cheng et al. | |
| 2012/0176676 A1* | 7/2012 | Sakamoto | G02B 5/3058 359/485.05 |
| 2014/0091056 A1* | 4/2014 | Chen | G02B 5/3083 216/24 |
| 2015/0084018 A1 | 3/2015 | Zhou | |
| 2015/0219907 A1 | 8/2015 | Li et al. | |
| 2016/0033782 A1 | 2/2016 | Wang | |
| 2016/0048055 A1 | 2/2016 | Dong et al. | |
| 2016/0238881 A1* | 8/2016 | Chong | G02F 1/133528 |
| 2017/0365088 A1 | 12/2017 | Bell et al. | |
| 2018/0101054 A1 | 4/2018 | Zha | |

FOREIGN PATENT DOCUMENTS

| | | |
|---|---|---|
| CN | 202563213 U | 11/2012 |
| CN | 102809848 A | 12/2012 |
| CN | 103235441 A | 8/2013 |
| CN | 103353673 A | 10/2013 |
| CN | 103852896 A | 6/2014 |
| CN | 105700268 A | 6/2016 |
| WO | 03/032058 A1 | 4/2003 |

\* cited by examiner

3D DISPLAY DEVICE

CROSS-REFERENCE TO RELATED APPLICATIONS

This application claims the benefit of Chinese Patent Application No. 201810089676.0 filed on Jan. 30, 2018 in the State Intellectual Property Office of China, the whole disclosure of which is incorporated herein by reference.

FIELD OF THE DISCLOSURE

At least one embodiment of the present disclosure relates to the field of display technology, and in particular to a 3D display device.

DESCRIPTION OF THE RELATED ART

In most conventional 3D display devices, a layer of retarder film is usually attached to an outer side of an upper polarizer such that the linearly polarized light exiting from the upper polarizer is changed to have two different polarization directions after passing through the odd and even rows of the retarder film, which may be respectively received by the left-eye and right-eye polarized glasses, realizing a stereoscopic display effect. However, in such a 3D display device, the viewing angle in the vertical direction is very narrow, thereby negative affecting display effect of the 3D display device.

SUMMARY

A 3D display device is proposed in at least one embodiment of the present disclosure.

According to at least one embodiment of the present disclosure, a 3D display device is provided, including:
a first substrate and a second substrate disposed opposite to each other;
a liquid crystal layer between the first substrate and the second substrate;
a color filter layer between the first substrate and the liquid crystal layer, a plurality of pixel regions arranged in an array being formed on the color filter layer, and each of the plurality of pixel regions comprising a first sub-pixel and a second sub-pixel; and
a first polarizer on a side of the first substrate, the first polarizer comprising a plurality of wire grid polarizers arranged in an array, two adjacent ones of the plurality of wire grid polarizers comprising a plurality columns of first sub-wire grid polarizers and a plurality columns of second sub-wire grid polarizers which are alternately arranged with each other and have different wire grid extending directions,
wherein an orthographic projection of each column of first sub-wire grid polarizers on the pixel regions is overlapped with at least one column of first sub-pixels, and an orthographic projection of each column of second sub-wire grid polarizers on the pixel regions is overlapped with at least one column of second sub-pixels.

According to at least one embodiment of the present disclosure, the 3D display device further includes: a TFT layer disposed on the second substrate; and a second polarizer is disposed between the TFT layer and the liquid crystal layer.

According to at least one embodiment of the present disclosure, a wire grid extending direction of each first sub-wire grid polarizer is parallel to a polarization axis of the second polarizer, and a wire grid extending direction of each second sub-wire grid polarizer is perpendicular to the polarization axis of the second polarizer.

According to at least one embodiment of the present disclosure, a wire grid extending direction of each of the first sub-wire grid polarizers is perpendicular to a polarization axis of the second polarizer, and a wire grid extending direction of each of the second sub-wire grid polarizers is parallel to the polarization axis of the second polarizer.

According to at least one embodiment of the present disclosure, a ½ phase retarder is provided between the first polarizer and the second polarizer, and comprises a plurality columns of phase retarding portions and a plurality columns of transparent portions that are arranged alternately in an array an orthographic projection of each column of phase retarding portions on the pixel regions is overlapped with at least one column of first sub-pixels in the pixel regions, and an orthographic projection of each of the transparent portions on the pixel regions is overlapped with at least one column of second sub-pixels in the pixel regions.

According to at least one embodiment of the present disclosure, the ½ phase retarder is disposed between the first polarizer and the liquid crystal layer.

According to at least one embodiment of the present disclosure, the ½ phase retarder is disposed between the second polarizer and the liquid crystal layer.

According to at least one embodiment of the present disclosure, the 3D display device further includes: a first alignment film disposed on a side of the liquid crystal layer adjacent to the first substrate, and a second alignment film disposed on a side of the liquid crystal layer adjacent to the second substrate.

According to at least one embodiment of the present disclosure, orientation directions of the first alignment film and the second alignment film are different from each other, and liquid crystal molecules in the liquid crystal layer include twisted nematic liquid crystal molecules.

According to at least one embodiment of the present disclosure, the orientation directions of the first alignment film and the second alignment film are perpendicular to each other.

According to at least one embodiment of the present disclosure, each of the first alignment film and the second alignment film comprises a plurality columns of first alignment portions and a plurality columns of second alignment portions that are alternately arranged in an array, alignment directions of the first alignment portions and the second alignment portions being perpendicular to each other. An orthographic projection of each column of first alignment portions of the first alignment film on the pixel regions is overlapped with at least one column of first sub-pixels in the pixel regions, and an orthographic projection of each column of second alignment portions of the first alignment film on the pixel regions is overlapped with at least one column of second sub-pixels in the pixel regions. An orthographic projection of each column of first alignment portions of the second alignment film on the pixel regions is overlapped with at least one column of second sub-pixels in the pixel regions, and an orthographic projection of each column of second alignment portions of the second alignment film on the pixel regions is overlapped with at least one column of first sub-pixels in the pixel regions. The liquid crystal molecules in the liquid crystal layer include twisted nematic liquid crystal molecules.

According to at least one embodiment of the present disclosure, the 3D display device further includes a ¼ phase film disposed on a side of the first substrate.

According to at least one embodiment of the present disclosure, the 3D display device further includes a backlight unit configured to emit a backlight and cause the backlight to be incident on the second polarizer.

According to at least one embodiment of the present disclosure, the 3D display device further includes a pixel electrode disposed between the liquid crystal layer and the TFT layer.

According to at least one embodiment of the present disclosure, wire grids of each of the plurality of wire grid polarizer comprise a plurality of metal wires.

According to at least one embodiment of the present disclosure, the metal wires are disposed in a linear groove formed in a third substrate.

According to at least one embodiment of the present disclosure, the metal wires are further configured to serve as a common electrode.

BRIEF DESCRIPTION OF THE DRAWINGS

The above and other features of the present disclosure will become more apparent by describing in the detailed exemplary embodiments thereof with reference to the accompanying drawings, in which.

DETAILED DESCRIPTION OF EMBODIMENTS

Figure 1A:
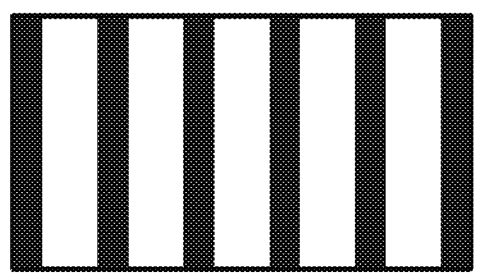
FIG. 1A is a top view showing a wire grid polarizer according to an exemplary embodiment of the present disclosure.

A 3D display device provided by the embodiment of the present disclosure will be described in detail below with reference to the accompanying drawings. In the description, the same or similar reference numerals indicate the same or similar components. Moreover, the drawings are not necessarily to scale and emphasis instead is generally placed upon illustrating the principles of the disclosure. The description of the embodiments of the present disclosure with reference to the drawings is intended to explain the general inventive concept of the present disclosure, and is not to be construed as a limiting to the present disclosure.

In addition, in the following detailed description, for the purpose of convenient explanation, numerous specific details are set forth to provide a thorough understanding of the disclosed embodiments. Obviously, however, one or more embodiments may be implemented without these specific details. In other instances, well-known structures and devices are illustratively shown in the drawings to simply the drawings.

According to a general inventive concept of an embodiment of the present disclosure, a 3D display device based on wire grid polarizers is provided, including: a first substrate and a second substrate disposed opposite to each other; a liquid crystal layer between the first substrate and the second substrate; a color filter layer between the first substrate and the liquid crystal layer, a plurality of pixel regions arranged in an array being formed on the color filter layer, and each of the plurality of pixel regions comprising a first sub-pixel and a second sub-pixel; and a first polarizer on a side of the first substrate, the first polarizer comprising a plurality of wire grid polarizers arranged in an array, two adjacent ones of the plurality of wire grid polarizers comprising a plurality columns of first sub-wire grid polarizers and a plurality columns of second sub-wire grid polarizers which are alternately arranged with each other and have different wire grid extending directions. An orthographic projection of each column of first sub-wire grid polarizers on the pixel regions is overlapped with at least one column of first sub-pixels, and an orthographic projection of each column of second sub-wire grid polarizers on the pixel regions is overlapped with at least one column of second sub-pixels.

Figure 1B:
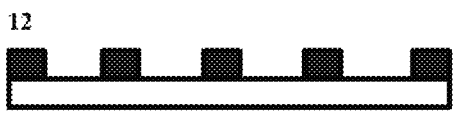
FIG. 1B is a side view showing the wire grid polarizer shown in FIG. 1.

Prior to describing in detail the 3D display device provided by the embodiment of the present disclosure, the structure of the wire grid polarizer will be briefly introduced firstly with reference to FIGS. 1A and 1B.

Referring to FIGS. 1A and 1B, FIG. 1A shows a top view of a wire grid polarizer according to an exemplary embodiment of the present disclosure; and FIG. 1B is a side view showing the wire grid polarizer shown in FIG. 1. In an exemplary embodiment, the wire grid polarizer 10 includes a substrate 11 and a plurality of metal wire grids 12 formed on the substrate 11, wherein the plurality of metal wire grids 12 extend parallel to each other. In general, linear grooves may be formed on the substrate 11 by, for example, a holographic process. And then a metal material is buried into the linear grooves and is formed as metal wires, thereby obtaining the metal wire grids 12 for the wire grid polarizer 10. Typically, the metal wire grids 12 are made of a metal material such as BaF2, CaF2, KRS-5, ZnSe or the like. The substrate 11 may be formed of a material such as quartz or glass. Of course, it should be appreciated for those skilled in the art that the materials listed above are merely shown for convenience of explanation to the technical solutions of the present disclosure, and do not represent any limitation to the present disclosure.

When light is incident on such wire grid polarizer 10, a portion of the incident light, of which a direction of an electric field (i.e., the polarization direction) is parallel to an extending direction of the metal grid wires, will cause electrons in the metal wire grid to vibrate, such that the portion of the incident light is absorbed by the metal wire grid. However, in contrast to this, a portion of the incident light of which the direction of the electric field or the polarization direction is perpendicular to the extending direction of the metal wire grid will not cause such an absorption phenomenon, and thus is transmitted through the wire grid polarizers 10. Thus, to some extent, the wire grid polarizer 10 achieves a selection of polarization direction of incident light. Specifically, the wire grid polarizer 10 allows only light having a polarization direction (i.e., a direction of an electric field) perpendicular to the extending direction of the metal grid wires to be transmitted through without hindrance, and light having a polarization direction parallel to the extending direction of the metal grid wires to be absorbed.

Figure 2:
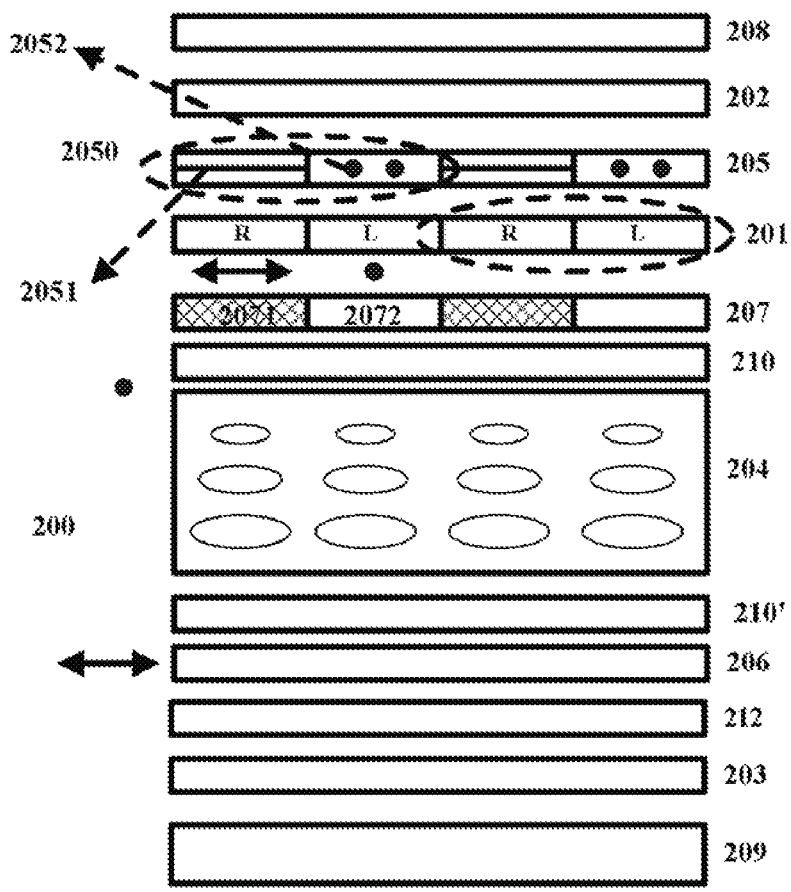
FIG. 2 is a schematic partial cross-sectional view showing a 3D display device according to an exemplary embodiment of the present disclosure.

Based on this polarization selection characteristic of the wire grid polarizer, at least one embodiment of the present disclosure provides a 3D display device. As shown in FIG. 2, the 3D display device 200 may include a backlight unit 209, a lower substrate 203 (second substrate), a TFT layer 212, a lower polarizer 206 (second polarizer), a second alignment film 210', a liquid crystal layer 204, a first alignment film 210, a ½ phase retarder 207, a color filter layer 201, an upper polarizer 205 (first polarizer), an upper substrate 202 (first substrate), and a ¼ phase film 208 which are sequentially arranged from bottom to top. Next, the structure and function of these layers in the 3D display device 200 will be described.

In addition to the typical backlight unit 209, the lower substrate 203, the lower polarizer 206, such as a linear polarizer, the liquid crystal layer 204, and the upper substrate 202, the 3D display device 200 of the embodiment of the present disclosure may further include a first alignment film 210 disposed on a side of the liquid crystal layer 204 adjacent to the upper substrate 202 and a second alignment film 210' disposed on the other side of the liquid crystal layer 204 adjacent to the lower substrate 203, both of which are used together to control an initial orientation of the liquid crystal molecules in the liquid crystal layer 204. In general, both the first alignment film 210 and the second alignment film 210' may be uniform alignment films, that is, have the same orientation direction in different portions thereof. Further, the first alignment film 210 and the second alignment film 210' have orientation directions different from each other. For example, the first alignment film 210 and the second alignment film 210' have orientation directions perpendicular to each other, thereby providing a corresponding initial orientation for the twisted nematic liquid crystal molecules in the liquid crystal layer 204, as shown in FIG. 2. In such a instance, if no voltage is initially applied to the liquid crystal molecules in the liquid crystal layer 240, that is, no voltage is applied to the corresponding common electrode and the pixel electrode, all liquid crystal molecules in the liquid crystal layer 240 will be arranged by following the orientation directions of the first alignment film 210 and the second alignment film 210'.

It should be noted that, although orientation settings of the corresponding first alignment film 210 and second alignment film 210' are schematically described in the above embodiments when twisted nematic liquid crystal molecules are selected as the liquid crystal molecules in the liquid crystal layer 204, the disclosure is not limited thereto. It will be understood by those skilled in the art that when the liquid crystal molecules in the liquid crystal layer 204 are selected in other forms, the orientation directions of the first alignment film 210 and the second alignment film 210' may be selected to be parallel to each other, or have an angle between a parallel direction and a vertical direction, that is, within a range of 0°-90°, thereby providing a suitable initial orientation for the corresponding liquid crystal molecules. Other suitable choices for liquid crystal molecules and the specific arrangement of corresponding alignment films will be readily appreciated by those skilled in the art from the benefit of the spirit and the teachings of the present disclosure, and the disclosure should encompass all of such alternative forms.

According to an exemplary embodiment, in the 3D display device 200, the upper substrate 202 and the lower substrate 203 are disposed opposite to each other; the liquid crystal layer 204 is located between the upper substrate 202 and the lower substrate 203; the color filter layer 201 is disposed between the upper substrate 202 and the liquid crystal layer 203, a plurality of pixel regions arranged in an array being formed on the color filter layer 201. Each of the plurality of pixel regions may include a plurality columns of sub-pixels, for example, two sub-pixels, that is, a first sub-pixel (also called as a right eye sub-pixel) R and a second sub-pixel (also called as a left-eye sub-pixel) L shown in FIG. 2. The column of first sub-pixel R and the column of second sub-pixel L may respectively display image information adapted to be viewed by right eye and left eye, which will be described in detail below.

Figure 3:
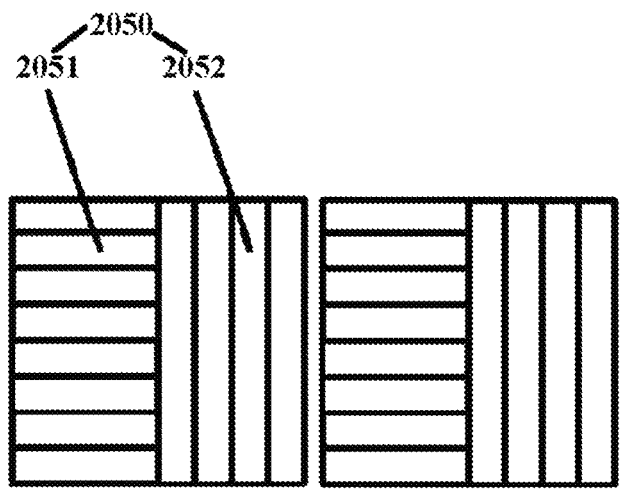
FIG. 3 is a top view schematically showing two adjacent wire grid polarizers used in the 3D display device shown in FIG. 2.

In the 3D display device provided by the embodiments of the present disclosure, as shown in FIGS. 2 and 3, the upper polarizer 205 includes a plurality of wire grid polarizers 2050 arranged in the array. Further, in the embodiment of the present disclosure, for convenient description, any two of the plurality of wire grid polarizers 2050 of the upper polarizer 205, which are adjacent to each other in a column direction of the array, comprise a plurality columns of the first sub-wire grid polarizers 2051 and a plurality columns of the second sub-wire grid polarizers 2052, which are alternately arranged with each other and have different wire grid extending directions. In FIG. 2, the plurality of columns of first sub-wire grid polarizer 2051 and the plurality of columns of second sub-wire grid polarizer 2052 in the two adjacent wire grid polarizers 2050 are schematically illustrated by horizontal lines (-) and dots (•) in the partial cross-sectional view, respectively. The specific structure of each of the first sub-wire grid polarizer 2051 and the second sub-wire grid polarizer 2052 may be the same as the wire grid polarizer 10 shown in FIG. 1.

With regard to the difference between the first sub-wire grid polarizer 2051 and the second sub-wire grid polarizer 2052, reference may be further made to FIG. 3, which is a top view schematically showing the two adjacent wire grid polarizers 2050 in the upper polarizer 205 used in the 3D display device shown in FIG. 2. As shown in FIG. 3, each wire grid polarizers 2050 of the 3D display device includes two portions, i.e. a left portion and a right portion. In one column of first sub-wire grid polarizers 2051 at the left side, the wire grid extends in a horizontal direction; and in one column of second sub-wire grid polarizers 2052 at the right side, the wire grid extends in a vertical direction, that is, perpendicular to the direction in which the wire grid in the one column of sub-wire grid polarizers 2051 at the left side extends. Thus, in the plurality of wire grid polarizers 2050 arranged in the array, the plurality of columns of first sub-wire grid polarizer and the plurality of columns of second sub-wire grid polarizer in any two adjacent wire grid polarizers in the column direction have different wire grid extending directions (or wire grid directions); or, the plurality of sub-wire grid polarizers having the same wire grid direction are alternately arranged in the column direction.

Further, the orthographic projection of each column of first sub-wire grid polarizers 2051 on the pixel regions is overlapped with at least one column of first sub-pixels R, and the orthographic projection of each column of second sub-wire grid polarizers 2051 on the pixel regions is overlapped with at least one column of second sub-pixels L.

By dividing display pixels into different columns of sub-pixels for left eye viewing and right eye viewing, and by providing different sub-wire grid polarizers corresponding to different sub-pixels, the 3D liquid crystal display device according to an embodiment of the present disclosure may provide different images for the left eye viewing and the right eye viewing simultaneously by means of one display device, achieving the 3D display effect.

In an exemplary embodiment, as shown in FIG. 2, a TFT layer 212 is disposed on the lower substrate 209 and includes a plurality of TFTs (Thin Film Transistors) that are adapted to supply a driving voltage to the pixel electrodes, and the lower polarizer 206 is disposed between the TFT layer 212 and the liquid crystal layer 204. A backlight unit 209 is configured to generate a backlight and cause the backlight to be incident into the lower polarizer 206. The extending direction of the wire grid of each first sub-wire grid polarizer 2051 is parallel to the polarization axis of the lower polarizer 206, and the extending direction of the wire grid of each second sub-wire grid polarizer 2052 is perpendicular to the polarization axis of the lower polarizer 206. In an alternative embodiment, the extending direction of the wire grid of each first sub-wire grid polarizer is perpendicular to the polarization axis of the lower polarizer 206, and the extending direction of the wire grid of each second sub-wire grid polarizer is parallel to the polarization axis of the lower polarizer.

In an exemplary embodiment, a ½ phase retarder 207 is provided between the upper polarizer 205 and the lower polarizer 206, and the ½ phase retarder 207 may also include a plurality of different portions arranged in an array. Specifically, the ½ phase retarder 207 may include a plurality columns of phase retarding portions 2071 and a plurality columns of transparent portions 2072 which are alternately arranged in an array. The phase retarding portions 2071 cause light transmitted therethrough to be retarded by a phase delay of ½λ, and the transparent portions 2072 are made of a light transmissive material, i.e., cause light incident thereon to transmit without any hindrance. The orthographic projection of each column of phase retarding portion 2701 on the pixel regions is overlapped with at least one column of first sub-pixel R in the pixel region, and the orthographic projection of each column of transparent portion 2702 on the pixel regions is overlapped with at least one column of second sub-pixel L in the pixel region.

The operation principle of the 3D display will be briefly explained below by means of the 3D display device 200 provided by the embodiment of the present disclosure with reference to FIGS. 2 and 3.

Referring to FIG. 2, when the backlight from the backlight unit 209 is incident on the lower polarizer 206, the lower polarizer 206 will polarize the backlight. Specifically, the lower polarizer 206 will allow the backlight to exit from the lower polarizer 206 while polarizing it as a linearly polarized light which has a polarization direction in parallel with the polarization axis of the lower polarizer 206. As an example, the polarization axis of the lower polarizer 206 is selected to be of the horizontal direction, that is, the direction shown by the double arrow (↔) in FIG. 2. In this case, the linearly polarized light having a horizontal polarization direction will be incident into the liquid crystal layer 204 after passing through the second alignment film 210'.

In the case where the liquid crystal molecules in the liquid crystal layer 204 are twisted nematic liquid crystal molecules, if no voltage is applied to the liquid crystal molecules in the liquid crystal layer 204, that is, the liquid crystal molecules maintain the initial orientation, then the linearly polarized light from the lower polarizer 206 will be transmitted through the liquid crystal layer 204 while the polarization direction thereof is rotated by 90°. That is, the light exits from the liquid crystal layer 204 in a polarization direction perpendicular to the plane of the paper, as schematically illustrated above the liquid crystal layer 204 by dots (•) in FIG. 2. In this manner, the light incident on the ½ phase retarder 207 will be linearly polarized light having a polarization direction perpendicular to the plane of the paper.

Since the ½ phase retarder 207 has the plurality columns of phase retarding portions 2071 and the plurality columns of transparent portions 2072 which are alternately arranged with respect to each other, and only the phase retarding portions 2071 cause the light passing therethrough to be retarded by a phase delay of ½ λ. Therefore, linearly polarized light having a polarization direction perpendicular to the plane of the paper will be emitted in different states due to propagation through different portions of the phase retarder 207. Specifically, for the portion of the linearly polarized light passing through the transparent portions 2072, since no additional polarization change occurs, the outgoing light from the transparent portion 2072 will also be linearly polarized light having a polarization direction perpendicular to the plane of the paper, as schematically shown by the dots (•) above the transparent portions 2072 in FIG. 2. However, in contrast, for the portion of the linearly polarized light passing through the phase retarding portions 2071, since the phase retarding portions 2071 may delay the phase of the light by ½λ, (that is, the polarization direction further undergoes a deflection of 90°), the polarization direction of the outgoing light from the phase retarding portions 2071 will changed from the direction perpendicular to the plane of the paper before entering the phase retarding portions 2071 to a direction horizontally extending in (or parallel to) the plane of the paper, as schematically shown by the double arrow (↔) above the phase retarding portions 2071 in FIG. 2. In this manner, the linearly polarized lights respectively emitted from the phase retarding portions 2071 and the transparent portions 2072 will have polarization directions perpendicular to each other.

Further, the two portions of linearly polarized light outgoing from the ½ phase retarder 207 and the corresponding color filter layer 201 will be incident on different portions of the wire grid polarizer 2050, respectively. Specifically, referring to FIG. 2, the linearly polarized light from the phase retarding portions 2071, and also the first sub-pixel R (right-eye sub-pixel) of the color filter layer 201, i.e., having the polarization direction extending horizontally in the plane of the paper, will be incident on the first sub-wire grid polarizer 2051 at the left side, wherein the first sub-wire grid polarizer 2051 has a wire grid direction that also extends horizontally in the plane of the paper. This means that the direction in which the wire grid of the wire grid polarizer extends is parallel to the polarization direction of the incident light. Therefore, according to the operation principle of the wire grid polarizer previously described with reference to FIG. 1, since the polarization direction of the incident light is parallel to the extending direction of the wire grid, then the incident light will be absorbed by the wire grid polarizer.

On the other hand, the extending direction of the wire grid (wire grid direction or wire grid extending direction) of the second sub-wire grid polarizer 2052 at the right side is perpendicular to the plane of the paper. Moreover, the polarization direction of the light incident on the second sub-wire grid polarizer 2052 at the right side is perpendicular to the plane of the paper. Based on the same operation principle, since the polarization direction of the light is parallel to the wire grid direction of the second sub-wire grid polarizer, this portion of the linearly polarized light then will also be absorbed. In such a case, no light will be emitted from the 3D display device 200. That is, the 3D display device of the embodiment of the present disclosure may achieve a fully black display without applying a voltage.

When it is desired to realize a fully bright display, for example, the maximum voltage may be applied to the liquid crystal layer 204 through the TFTs of the TFT layer 212 and its pixel electrodes. At this time, the liquid crystal molecules in the liquid crystal layer 204 will undergo a deflection of large amplitude. At this time, the liquid crystal molecules will not change the polarization direction of the linearly polarized light passing through the liquid crystal layer 204. That is, the polarization direction of the linearly polarized light exited from the liquid crystal layer 204 is maintained to be the horizontal direction in the plane of the paper. In such a case, similar to the previous fully black display, the light incident on the second sub-wire grid polarizer 2052 at the right side will have a polarization direction extending horizontally in the plane of the paper, and the light incident on the first sub-wire grid polarizer 2051 at the left side will have a polarization direction perpendicular to the plane of the paper due to the further phase delay raised by the phase delay portion 2071 (specifically, a phase delay of $\frac{1}{2}\lambda$), which is completely contrary to the polarization in the fully black state shown in FIG. 2. This means that regardless of being incident on which portion of the wire grid polarizer 2050, the polarization direction of the linearly polarized light incident on the wire grid polarizer 2050 is perpendicular to the direction in which the corresponding wire grid extends. Therefore, the light will be transmitted through the wire grid polarizer 2050 without hindrance, thereby achieving a fully bright display.

Based on a similar analysis, in the case where any intermediate voltage between the lowest voltage required for the fully black display and the highest voltage required for the fully bright display is applied to the liquid crystal molecules in the liquid crystal layer 204, the display of corresponding intermediate gray scale may be realized, and it will not be repeated in the present disclosure.

In the 3D liquid crystal display device of the embodiment of the present disclosure, by dividing the display pixels into different sub-pixels for left-eye viewing and right-eye viewing, and by providing a wire grid polarizer and a $\frac{1}{2}$ phase retarder that each have different sub-portions corresponding to the display pixels, different images for the left-eye viewing and right-eye viewing may be simultaneously provided by means of one display device, thereby realizing the effect of 3D display.

In addition, it should also be noted that although in the embodiment described above in connection with FIG. 2, the wire grid directions of two sub-portions, i.e., the first sub-wire grid polarizer 2051 and the second sub-wire grid polarizer 2052, of the adjacent two wire grid polarizers 2050 are arranged to be parallel and perpendicular to the polarization axis of the lower polarizer 206, respectively, but the present disclosure is not limited thereto. Those skilled in the art will appreciate that, based on the teachings of the inventive concept of the present disclosure, the two sub-wire grid polarizers may employ any other suitable wire grid extending direction, as long as they are different from each other (e.g., perpendicular to each other).

According to a specific embodiment, the 3D display device of an embodiment of the present disclosure may further include a $\frac{1}{4}$ phase film. As shown in FIG. 2, the $\frac{1}{4}$ phase film 208 is disposed on the outer side of the upper substrate 202 of the 3D display device 200, that is, provided as the last optical device in the entire optical path of the 3D display device. Of course, it should be noted that this arrangement of the $\frac{1}{4}$ phase film represents only one specific example and does not constitute any limitation to the present disclosure. Alternatively, in other examples, the $\frac{1}{4}$ phase film may also be disposed on the inner side of the upper substrate 202, that is, between the upper substrate 202 and the wire grid polarizer 2050. Such $\frac{1}{4}$ phase film is configured to cause the light incident on the $\frac{1}{4}$ phase film to have a phase delay of $\frac{1}{4}\lambda$. In such a case, the polarized light incident on the $\frac{1}{4}$ phase film will become circularly polarized light after passing through the $\frac{1}{4}$ phase film. Furthermore, since the linearly polarized lights from the first sub-wire grid polarizer 2051 and the second sub-wire grid polarizer 2052 in each of the wire grid polarizers 2050 have the polarization directions orthogonal to each other, the two portions of linearly polarized light will be converted into left-handed circularly polarized light and right-handed circularly polarized light, respectively, after passing through the same $\frac{1}{4}$ phase film. In this way, by means of these two kinds of left-handed circularly polarized light and right-handed circularly polarized light, a 3D stereoscopic display for left-eye viewing and right-eye viewing is also achieved.

Further, it should be noted that although the $\frac{1}{2}$ phase retarder 207 is disposed on the side of the liquid crystal layer 204 adjacent to the upper substrate 202 in FIG. 2, that is, on the upper side of the liquid crystal layer 204 in FIG. 2, the disclosure is not limited thereto. In an alternative embodiment, the $\frac{1}{2}$ phase retarder 207 may also be disposed on the side of the liquid crystal layer 204 adjacent to the lower substrate 203, that is, on the lower side of the liquid crystal layer 204 in FIG. 2. Such embodiment will be described in detail below with reference to FIG. 4. For example, as shown in FIG. 2, the $\frac{1}{2}$ phase retarder 207 is disposed between the upper polarizer 205 and the liquid crystal layer 204. In an alternative embodiment, the $\frac{1}{2}$ phase retarder is disposed between the lower polarizer and the liquid crystal layer.

Figure 4:
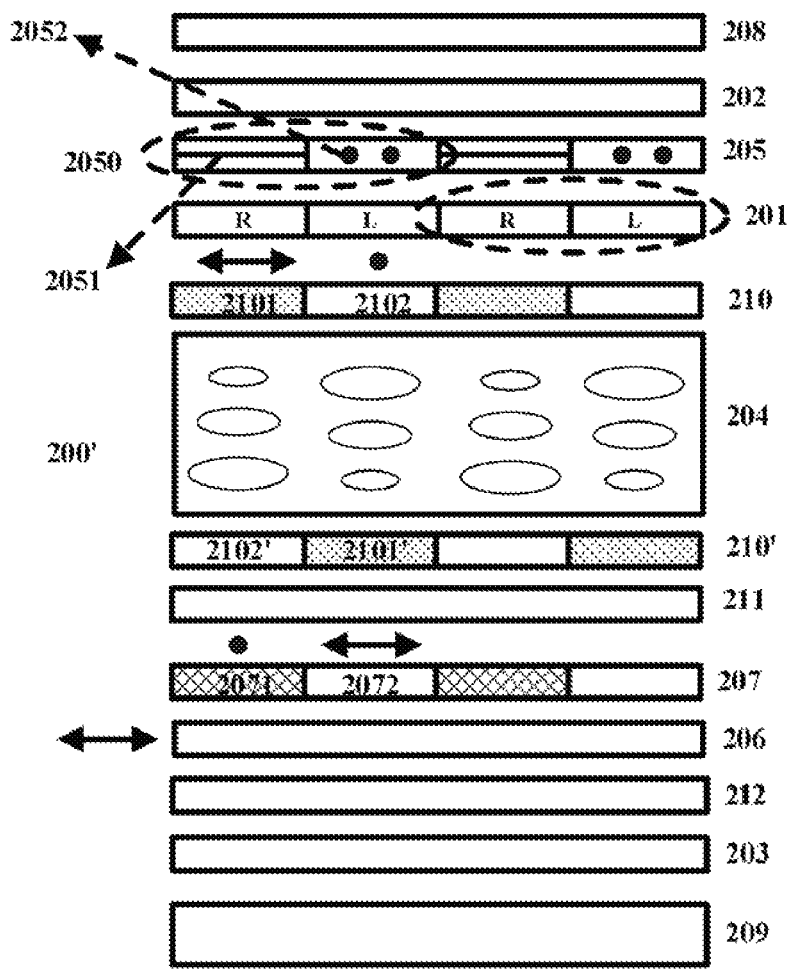
FIG. 4 is a schematic partial cross-sectional view showing a 3D display device according to another exemplary embodiment of the present disclosure.

Specifically, FIG. 4 shows a schematic partial cross-sectional view of a 3D display device in accordance with another embodiment of the present disclosure. The 3D display device 200' shown in FIG. 4 is substantially the same as the 3D display device 200 shown in FIG. 2, and thus the same reference numerals are used to denote the same components. The 3D display device 200' shown in FIG. 4 mainly differentiates from the 3D display device 200 shown in FIG. 2 in that: in the 3D display device 200', 1) the $\frac{1}{2}$ phase retarder 207 is disposed on the lower side of the liquid crystal layer 204; 2) the first alignment film 210 and the second alignment film 210' each include a plurality columns of first alignment portions 2101 and a plurality columns of second alignment portions 2102 which are alternately arranged in an array; and 3) the 3D display device 200' may further include a pixel electrode 211.

It will be appreciated by those skilled in the art that no matter whether the $\frac{1}{2}$ phase retarder 207 is disposed on the upper side or on the lower side of the liquid crystal layer 204 (that is, upstream or downstream of the liquid crystal layer 204 in the light propagation direction), the $\frac{1}{2}$ $\lambda$ phase delay (corresponding to the phase delay portion 2071) or the zero phase delay (corresponding to the transparent portion 2072) of the light may be realized. The root cause for this is that no matter the $\frac{1}{2}$ phase retarder 207 or the liquid crystal molecules in the liquid crystal layer 204, they are in essence acted as optical devices that cause phase delay of the linearly polarized light incident thereto (that is, the polarization direction thereof is deflected) without depending on the arrangement order of the $\frac{1}{2}$ phase retarder 207 and the liquid crystal layer 204. For the case where the $\frac{1}{2}$ phase retarder 207 is located upstream of the liquid crystal layer 204, as shown in FIG. 4, those skilled in the art may appreciate, from the description of the previous embodiment (i.e., the embodiment shown in FIG. 2), the operation principle of realizing 3D display of different gray scales, which will not be repeatedly explained in the present disclosure.

Next, the principle that the 3D display device of the embodiment of the present disclosure realizes the 3D display when the first alignment film 210 and the second alignment film 210' each include different alignment portions 2101 and 2102 will be given with reference to FIG. 4. Specifically, each of the first alignment film 210 and the second alignment film 210' includes a plurality columns of first alignment portions 2101 and a plurality columns of second alignment portions 2102 which are alternately arranged in an array, the first alignment portions 2101 and the second alignment portions 2102 having orientation directions perpendicular to each other. Moreover, as shown in FIG. 4, an orthographic projection of each column of the first alignment portions 2101 of the first alignment film 210 on the pixel regions is overlapped with at least one column of first sub-pixels R in the pixel region, and an orthographic projection of each column of the second alignment portions 2102 of the first alignment films 210 on the pixel regions is overlapped with at least one column of second sub-pixels L in the pixel region. An orthographic projection of each column of the first alignment portions of the second alignment film 210' on the pixel regions is overlapped with at least one column of second sub-pixels L in the pixel region, and an orthographic projection of each column of the second alignment portions of the second alignment film 210' on the pixel regions is overlapped with at least one column of first sub-pixels R in the pixel region. That is to say, each column of the first alignment portions 2101 of the first alignment film 210 and each column of the second alignment portions 2102' of the second alignment film 210' are arranged in alignment with each other, so their orthographic projections in the thickness direction of the 3D display device are overlapped with at least one column of first sub-pixels R; meanwhile, each column of second alignment portions 2102 of the first alignment film 210 and each column of first alignment portions 2101' of the second alignment film 210' are arranged in alignment with each other, so their orthographic projections in the thickness direction of the 3D display device are overlapped with at least one column of second sub-pixels L. In this way, in the initial state, the twisted nematic liquid crystal molecules in different portions of the liquid crystal layer 204 will have different initial alignments based on the orientation directions of the different alignment portions 2101, 2102, 2101' and 2102'. This will be helpful to realize a multi-domain structure of the entire display device in which the display device includes both a multi-domain liquid crystal layer and a multi-domain wire grid polarizer, for example, each wire grid polarizer 2050 has two different sub-wire grid polarizers 2051, 2052.

In the fully black state and in the full bright state, the 3D display device 200' in FIG. 4 implements the corresponding fully black display and full bright display in the same manner as the 3D display device 200 in FIG. 2. Specifically, when it is required to realize the fully black display, the light incident on the left first sub-wire grid polarizer 2051 has the original polarization direction, that is, the polarization direction parallel to the wire grid extending direction (as shown schematically in FIG. 4 above the liquid crystal layer 204 with double arrows), due to two 90 degree deflections of the polarization direction respectively caused by the phase retarding portions 2071 and the twisted nematic liquid crystal molecules; and the light incident on the right second sub-wire grid polarizer 2052 has a polarization direction perpendicular to the plane of the paper, that is, the polarization direction also parallel to the corresponding wire grid extending direction (as shown schematically in FIG. 4 above the liquid crystal layer 204 with the dots), due to the occurrence of the 90° deflection caused only by the twisted nematic liquid crystal molecules. In this manner, the 3D display device of the embodiment of the present disclosure achieves the fully black display.

Similarly, when it is required to achieve the full bright display, considering that the nematic liquid crystal molecules in the liquid crystal layer 204 will not change, for example, the polarization direction of light, the light incident on the left first sub-wire grid polarizer 2051 has a polarization direction perpendicular to the plane of the paper, that is, have a polarization direction perpendicular to the direction in which the wire grid extends, since the 90 degree deflection of the polarization direction (caused by the phase delay portion 2071) occurs one time; and the light incident on the right second sub-wire grid polarizer 2052 maintains the polarization direction that extends horizontally in the plane of the paper, that is, also has the polarization direction perpendicular to the direction in which the wire grid extends, due to the unchanging of the polarization direction of the light passing through the liquid crystal layer 204, thereby achieving the fully bright display. For the case in which a display of any other intermediate gray scale values is required, it should be able to easily understand by those skilled in the art based on the above description, which will not be repeatedly described in the present disclosure.

In an exemplary embodiment, the 3D display device 200' of the present disclosure may further include a pixel electrode 211 for driving liquid crystal molecules in the liquid crystal layer 204 to be deflected, as shown in FIG. 4. Although such pixel electrode 211 illustrated in FIG. 4 is located between the liquid crystal layer 204 and the ½ phase retarder 207, this is merely an example and does not represent any limitation to the present disclosure. In fact, those skilled in the art will appreciate that the common electrode 211 may be disposed at any suitable location throughout the display device, such as on the underside of the ½ phase retarder 207.

Further, in one embodiment, in the upper polarizer (i.e., wire grid polarizer) 205, the wire grid may be made of a plurality of metal wires, for example, made of aluminum wire. The metal wires are disposed in linear grooves formed on a third substrate of the wire grid polarizer. Since the metal wire grid in the wire grid polarizer 2050 is arranged in alignment with the sub-pixels of the color filter layer 201, that is, the orthographic projections thereof in the thickness direction are overlapped with each other, in a further embodiment, such a metal wire grid may further be reused as a common electrode of a pixel unit. In such a case, in the entire display device finally formed, it would not be necessary to separately provide the common electrode layer, thereby contributing to reducing the total thickness of the display device and reducing the loss of the light that is, improving the usage efficiency of the backlight.

Figure 5A:
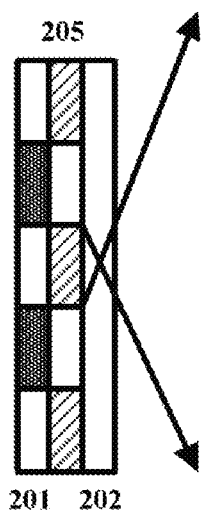
FIG. 5A is a schematic view showing the principle how light emitted from a color filter layer is emitted from the entire display device in a 3D display device according to an embodiment of the present disclosure.
Figure 5B:
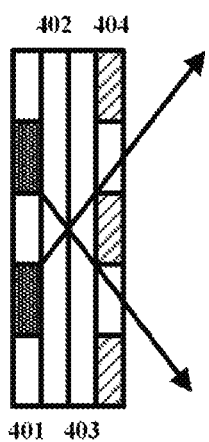
FIG. 5B is a schematic view showing the principle how light emitted from the color filter layer is emitted from the entire display device in a 3D display device according to a conventional scheme.

A 3D display device according to an embodiment of the present disclosure utilizes the wire grid polarizer to polarize light from the liquid crystal layer, referring to FIG. 5A and FIG. 5B which are respectively a schematic view showing the principle how light emitted from a color filter layer is emitted from the entire display device in a 3D display device according to an embodiment of the present disclosure and in a 3D display device according to a conventional scheme.

Specifically, in FIG. 5A, it is only necessary for the light from the color filter layer 201 to pass through the upper polarizer (i.e., wire grid polarizer) 205 and the upper substrate 202 during exiting the entire display device. However, in contrast, in the conventional 3D display device using the retarder film as shown in FIG. 5B, it is necessary for the light from a color filter layer 401 to sequentially pass through an upper substrate 402, an upper polarizing sheet 403, and a retarder film 404. Obviously, compared with the conventional 3D display device using the retarder film shown in FIG. 5B, in the 3D display device proposed by the present disclosure, the light from the color filter layer only needs to pass through less layer structures before leaving the entire display device, thereby enlarging the 3D display views of the 3D display device while improving the 3D display effect thereof.

Further, in the 3D display device proposed by the present disclosure, a retarder film may be provided inside of the upper substrate, for example, between the upper substrate and the wire grid polarizer, in connection with the arrangement of the wire grid polarizer. In this way, during manufacturing the 3D display device of the embodiment of the present disclosure, it is unnecessary to perform an alignment bonding process of bonding the retarder film on outside of the upper substrate after completing processes of manufacturing a display panel comprising the upper substrate and the lower substrate, thereby facilitating to reduce the technical difficulty of manufacturing the 3D display device and promoting a better display result thereof.

It should be noted that, in all the descriptions herein, although the various layer structures in the 3D display device are shown in a spatially separated manner from each other in the drawings, this is only for clarity of illustration and description, and does not represent any limitation to the disclosure. In fact, on the basis of the teachings of the inventive concept of the present disclosure, those skilled in the art should readily appreciate that the various layer structures in the 3D display device may be fitted to each other in any advantageous manner in accordance with any advantageous positional relationship. It is to be understood that the positional arrangement of the various layer structures in the 3D display device as exemplified herein is merely for the purpose of explaining the principles of the present disclosure and providing a teaching of the inventive concept of the present disclosure to those skilled in the art and does not represent any limitation to the disclosure. Based on the teachings of the inventive concept of the present disclosure, those skilled in the art should be able to devise various possible positional arrangements in accordance with the specific practice and requirements, and the present disclosure is not limited in this aspect.

Furthermore, it is to be noted that expressions herein such as "upstream" and "downstream" refer to the relative positional relationship of the two components along the propagation direction of the light. As an example, the expression "the component A is disposed upstream of the component B" means that the component A is disposed closer to the light source than the component B. Similarly, the expression "the component A is disposed downstream of the component B" means that the component A is disposed farther from the light source than the component B.

Further, it should also be noted that the expression herein such as "orthographic projection of component A on component B" means that a projection area is obtained by projecting the component A onto the component B in the normal direction of component B, rather than any oblique direction other than 90°.

Those skilled in the art will appreciate that the term "substantial" herein may further refers to embodiments using "thorough", "complete", "all", and the like. Thus, in an embodiment, the adjectives "substantial" may also be removed. Where applicable, the term "substantial" may also relate to 90% or higher, such as 95% or higher, particularly 99% or higher, and particularly even more 99.5% or higher, including 100%. The term "including" also refers to an embodiment in which the term "including" means "consisting of." The term "and/or" particularly relates to one or more of the items mentioned before and after "and/or". For example, the phrase "item 1 and/or item 2" and similar phrases may refer to one or more of items 1 and 2. The term "including" in the embodiment may mean "consisting of," but in another embodiment may mean "including at least the defined species and one or more other optional species."

In addition, the terms first, second, third, etc. in the specification and claims are used to distinguish between similar elements and are not necessarily used to describe the sequence or chronological order. It is to be understood that the terms used as such are interchangeable, where appropriate, and that the embodiments of the present disclosure described herein can operate in other sequences besides those described or illustrated herein.

It should be noted that the above-mentioned embodiments are illustrative and not a limitation to the present disclosure and that many alternative embodiments can be devised by those skilled in the art without departing from the scope of the appended claims. Any reference signs placed in the claims between parentheses shall not be construed as a limitation to the claims. The use of the verb "include" and its conjugations does not exclude the presence of the elements or steps other than those recited in the claims. The article "a" or "an" before the element does not exclude the presence of a plurality of such elements. The present disclosure can be implemented by means of hardware including several discrete components, or by means of a suitably programmed computer. In the device claim enumerating several means, several of these means can be embodied by a same hardware. The mere fact that certain measures are recited in mutually different dependent claims does not indicate that the combination of these measures cannot be used to obtain benefits.

The present disclosure is also applicable to devices including one or more of the characterizing features described in the specification and/or shown in the drawings.

The various aspects discussed in this application can be combined to provide additional advantages. Additionally, some of the features may form the basis of one or more divisional applications.

What is claimed is:

1. A 3D display device comprising:
a first substrate and a second substrate opposite to each other;
a liquid crystal layer between the first substrate and the second substrate;
a color filter layer between the first substrate and the liquid crystal layer, a plurality of pixel regions arranged in an array being formed on the color filter layer, and each of the plurality of pixel regions comprising a first sub-pixel and a second sub-pixel;
a first polarizer on a side of the first substrate, the first polarizer comprising a plurality of wire grid polarizers arranged in an array, two adjacent ones of the plurality of wire grid polarizers comprising a plurality columns of first sub-wire grid polarizers and a plurality columns of second sub-wire grid polarizers which are alternately arranged with each other and have different wire grid extending directions;

a thin film transistor (TFT) layer on the second substrate; and a second polarizer between the TFT layer and the liquid crystal layer, wherein an orthographic projection of each column of first sub-wire grid polarizers on the pixel regions is overlapped with at least one column of first sub-pixels, and an orthographic projection of each column of second sub-wire grid polarizers on the pixel regions is overlapped with at least one column of second sub-pixels, wherein a ½ phase retarder is provided between the first polarizer and the second polarizer, and comprises a plurality columns of phase retarding portions and a plurality columns of transparent portions that are arranged alternately in an array, wherein an orthographic projection of each column of phase retarding portions on the pixel regions is overlapped with at least one column of first sub-pixels in the pixel regions, and an orthographic projection of each of the transparent portions on the pixel regions is overlapped with at least one column of second sub-pixels in the pixel regions, and wherein the ½ phase retarder is disposed between the first polarizer and the liquid crystal layer.

2. The 3D display device according to claim 1, wherein a wire grid extending direction of each first sub-wire grid polarizer is parallel to a polarization axis of the second polarizer, and a wire grid extending direction of each second sub-wire grid polarizer is perpendicular to the polarization axis of the second polarizer.

3. The 3D display device according to claim 1, further comprising:

a first alignment film disposed on a side of the liquid crystal layer adjacent to the first substrate, and a second alignment film disposed on a side of the liquid crystal layer adjacent to the second substrate.

4. The 3D display device according to claim 3, wherein alignment directions of the first alignment film and the second alignment film are different from each other, and wherein liquid crystal molecules in the liquid crystal layer comprise twisted nematic liquid crystal molecules.

5. The 3D display device according to claim 4, wherein the alignment directions of the first alignment film and the second alignment film are perpendicular to each other.

6. The 3D display device according to claim 1, further comprising:

a ¼ phase film on a side of the first substrate.

7. The 3D display device according to claim 1, further comprising:

a backlight unit configured to emit a backlight and cause the backlight to be incident on the second polarizer.

8. The 3D display device according to claim 1, wherein wire grids of each of the plurality of wire grid polarizer comprise a plurality of metal wires.

9. The 3D display device according to claim 8, wherein the metal wires are disposed in linear grooves formed in a third substrate.

10. The 3D display device according to claim 8, wherein the metal wires are further configured to serve as a common electrode.

* * * * *